United States Patent
Niemela (10) Patent No.: US 7,152,883 B2
(45) Date of Patent: Dec. 26, 2006

(54) BALLAST ASSEMBLY FOR VEHICLES

(75) Inventor: Cal G Niemela, Chassell, MI (US)

(73) Assignee: Douglas Dynamics, L.L.C., Milwaukee, WI (US)

(*) Notice: Subject to any disclaimer, the term of this patent is extended or adjusted under 35 U.S.C. 154(b) by 311 days.

(21) Appl. No.: 10/749,047

(22) Filed: Dec. 30, 2003

(65) Prior Publication Data

US 2004/0164537 A1 Aug. 26, 2004

Related U.S. Application Data

(60) Provisional application No. 60/450,077, filed on Feb. 25, 2003.

(51) Int. Cl.
*B62D 37/04* (2006.01)
*B62D 49/08* (2006.01)

(52) U.S. Cl. .................. 280/759; 280/757; 293/117; 293/151

(58) Field of Classification Search ............... 280/759, 280/757; 293/151, 117
See application file for complete search history.

(56) References Cited

U.S. PATENT DOCUMENTS

| | | | | |
|---|---|---|---|---|
| 3,032,352 A * | 5/1962 | Barrett | ........................ | 280/759 |
| 3,490,787 A * | 1/1970 | Lacey et al. | ................. | 280/759 |
| 3,730,545 A * | 5/1973 | Allori | ........................ | 280/759 |
| 4,068,876 A * | 1/1978 | Muellner | ..................... | 293/106 |
| 4,094,534 A * | 6/1978 | Welke et al. | ................ | 280/760 |
| 4,232,883 A * | 11/1980 | Bourgeous et al. | ......... | 280/759 |
| 4,580,811 A * | 4/1986 | Wykhuis et al. | ............. | 280/759 |
| 4,664,404 A * | 5/1987 | Schultz | ..................... | 280/461.1 |
| 5,462,309 A * | 10/1995 | Jeffers et al. | ................ | 280/759 |
| 6,209,898 B1 * | 4/2001 | Fortier et al. | ............... | 280/187 |
| 6,471,245 B1 * | 10/2002 | Schott | ......................... | 280/759 |
| 6,880,854 B1 * | 4/2005 | Powell | ....................... | 280/759 |

OTHER PUBLICATIONS

"Ballast Requirements for Vehicles with Snowplow," by Fisher Engineering, Rockland, Maine, dated Nov. 1, 1998.

* cited by examiner

*Primary Examiner*—Paul N. Dickson
*Assistant Examiner*—George D Spisich
(74) *Attorney, Agent, or Firm*—Wood, Herron & Evans, L.L.P.

(57) ABSTRACT

A ballast assembly for vehicles is mounted on one vehicle portion to balance the vehicle and counterbalance the weight of an implement such as a snowplow assembly on another portion of the vehicle. The ballast assembly includes a ballast member having a predetermined weight and a contour coordinated to the vehicle shape. A vehicle mounting member removably mounts the ballast member to the vehicle such as at a hitch receiver socket or to the vehicle frame at the rear end of the vehicle. The ballast member may comprise one or more metal plates stacked and secured to one another, or a hollow enclosure either temporarily or permanently filled with a weighted material such as sand, gravel, or concrete.

8 Claims, 4 Drawing Sheets

BALLAST ASSEMBLY FOR VEHICLES

CROSS REFERENCE TO RELATED APPLICATION

This application claims priority on U.S. provisional patent application Ser. No. 60/450,077, filed Feb. 25, 2003, the disclosure of which is hereby incorporated by reference herein.

FIELD OF THE INVENTION

This invention relates to devices for adding ballast weight to vehicles for use during plowing or winter conditions, and, more particularly, to a ballast assembly for attachment to a vehicle to balance the vehicle and counterbalance the weight of an implement such as a plow or other structure secured to another portion of the vehicle.

BACKGROUND OF THE INVENTION

Among vehicles used to remove snow from parking lots and roadways are small-to-medium-sized trucks, such as pickup trucks, with cargo capacities ranging from 500 to 4000 pounds. Such vehicles are commonly equipped with a snowplow assembly attached to the frame on the front of the vehicle. Such plow assemblies and associated mounting hardware weigh in the range of 400 to over 1500 pounds. With the plow assembly extending outwardly from the vehicle a sufficient distance to allow the blade to pivot left and right during plowing procedures, the weight of the plow, when connected to the mounting points on the front of the vehicle, redistributes a greater portion of the vehicle weight from the vehicle rear axle to the front axle. Such redistribution causes at least three significant problems.

First, the lack of sufficient weight on the rear wheels of a truck having a front mounted plow assembly causes a significant compromise in the vehicle braking ability, especially at the rear wheels. The lack of weight at the rear wheels results in a loss of traction causing the vehicle to skid rather than stop, presenting a major safety concern when the operator of the vehicle must reduce speed or stop quickly.

Secondly, a lack of sufficient weight at the rear wheels creates a loss of traction resulting in the spinning of the rear tires when the vehicle operator accelerates quickly. This is also a safety concern such as when it is necessary to accelerate quickly through a highway intersection. Loss of traction in such cases can expose the vehicle to the danger of collision and injury.

Thirdly, a loss of traction due to insufficient weight over the rear wheels results in a diminished capacity to plow heavy snow. In such circumstances, the rear tires break traction and spin out before the vehicle loses power. The vehicle has the power to push the snow, but due to the imbalance of weight from back to front, traction is lost and the snow removal task cannot be accomplished efficiently.

In the past, attempts have been made to overcome these weight transfer and loss of traction issues. It has been common to place various types of ballast material in the pickup truck box or cargo bed. Such ballast normally consists of sand bags, cement blocks, metal plates, or other heavy, dense material. For safe operation, the ballast material must be contained or secured in some way to prevent it from sliding forward rapidly and striking the rear of the vehicle cab when decelerating quickly or when the vehicle engages a snow bank when plowing. Various apparatus may be used to retain such ballast, such as wooden boards placed perpendicular to the length of the vehicle and just rearward of the rear wheel wells in the cargo bed, boxes or bins of sufficient width and height to house the ballast behind the rear wheel wells in the cargo bed, or steel plates which are mechanically attached to the bed of the vehicle rearward of the rear wheel wells using fasteners of various types to facilitate a secure mount.

However, each of these proposed solutions for loss of traction is cumbersome in use, prevents the pickup truck cargo bed from being fully and efficiently used for cargo hauling due to the inclusion of ballast materials in significant portions thereof during the plowing season, and is aesthetically displeasing when the truck is viewed. In addition, the use of conventional ballast does not position the ballast to most effectively offset the weight of the plow assembly relative to the rear axle.

Accordingly, a need exists for an efficient ballast assembly for attachment to a vehicle to offset the weight of an implement such as a plow assembly which can be located in position to effectively counterbalance and offset the weight of the plow assembly, be aesthetically pleasing and unobtrusive when mounted on the vehicle, maximize cargo hauling capabilities of the vehicle, and be adapted for ease of use and installation and removal when desired.

SUMMARY OF THE INVENTION

Accordingly, the present invention provides a ballast assembly for use on vehicles such as pickup trucks and the like as a counterweight to implements such as plow assemblies or other structures mounted to the vehicle. The ballast assembly is adapted for ease of installation and removal, is aesthetically pleasing and contoured and shaped to match the design of the vehicle, avoids the use of any space in the cargo hauling area of the truck or vehicle, and positions the weight of the ballast as effectively as possible for counterbalancing purposes.

In one form, the invention is a ballast assembly for use on vehicles as a counterweight to implements such as a plow or other structure mounted on the vehicle, the assembly comprising a ballast member having a predetermined weight and a contour coordinated to the vehicle shape at one area of the vehicle, and a vehicle mounting member on the ballast member adapted to mount on the vehicle adjacent the one area of the vehicle. The mounting member projects outwardly from the ballast member for removable engagement with the vehicle whereby, when installed on the vehicle, the assembly provides a counterbalance for implements such as a plow mounted on the vehicle.

In other aspects, the ballast assembly may include support means on the ballast member for adding additional ballast weight to the assembly. In a preferred embodiment, the ballast member is a first plate, the assembly including at least one additional plate, the support means including at least one support projection for receiving and supporting the at least one additional plate on the first plate.

In other aspects, the first plate and the at least one additional plate may be generally planar and adapted to be stacked against one another, while the mounting member is an elongated mounting projection adapted to be received in a hitch receiver socket at one end of the vehicle adjacent the vehicle bumper. Further, the mounting projection may include the support projection while the additional plate includes a first aperture receiving the support projection such that the first plate and the additional plate are stacked against one another.

In yet other aspects, second and third support projections, each spaced from the one support projection, may extend outwardly away from the first plate with the additional plate including second and third apertures spaced from the first aperture and corresponding to the position of the second and third support projections for receiving those support projections when the additional plate is mounted to the first plate. A fastener may be included on at least one of the first, second, and third support projections to retain the additional plate on the assembly.

In yet further aspects, a plurality of additional plates may be mounted on the support projections so as to add a significant amount of additional weight. In addition, the various plates of the ballast assembly may each be contoured and shaped to match and coordinate with the shape of the bumper at the one end of the vehicle on which the assembly is mounted so as to blend with the vehicle design.

In other aspects of the invention, the support means on the ballast member for adding additional weight to the assembly may comprise a hollow enclosure adapted to receive weighted material therein to increase the ballast weight of the assembly. The hollow enclosure may include at least one removable closure for filling the hollow enclosure with the weighted material and a second removable closure for emptying the weighted material therefrom. The hollow enclosure may also be mounted to the vehicle by means of an elongated mounting projection adapted for receipt in a hitch receiver socket at the rear of the vehicle adjacent the vehicle bumper.

Alternately, other mounting projections removably fastened to the vehicle frame can be used to secure the ballast assembly. In such case, when the ballast assembly is mounted at the rear of the vehicle, the ballast members are shaped and contoured to allow access to the hitch receiver socket for receipt of a ball hitch projection so that the vehicle can tow a trailer while the ballast assembly remains mounted to the vehicle.

The ballast assembly of the present invention provides significant advantages over prior known ballast weight used in vehicles. The present assembly uses existing hitch receiver socket structure commonly available on the vehicles, such as pickup trucks or utility vehicles, at the rear end of the vehicle whereby the ballast assembly is suspended from the rear of the vehicle without utilizing any of the cargo area of the vehicle. This allows use of the entire vehicle cargo area for cargo handling and hauling capabilities even when the plow assembly is mounted on the vehicle during the winter or plowing seasons. The present invention thereby avoids the need to build or add other structures in or on the vehicle to retain or restrain ballast from moving about the cargo bed. In addition, the present invention is easy to mount and assemble on the vehicle, and is manageable by one person since, in the preferred embodiment, the ballast assembly may be installed in piecemeal fashion by adding additional plates one at a time. The completed assembly is aesthetically pleasing and is contoured and matched to the shape of the bumper against which it is fitted, typically at the rear of the vehicle. The assembly positions concentrated weight at the optimum position on the vehicle to counterbalance the plow assembly on the front. Such position is as far as possible behind the rear axle. Further, the assembly stays in place and avoids the problems of loose ballast in the vehicle cargo area which could shift or slide during rapid acceleration or deceleration movements of the plowing vehicle.

These and other advantages will become more apparent from a study of the following description taken in conjunction with the drawings.

DESCRIPTION OF THE PREFERRED EMBODIMENTS

Figure 1:
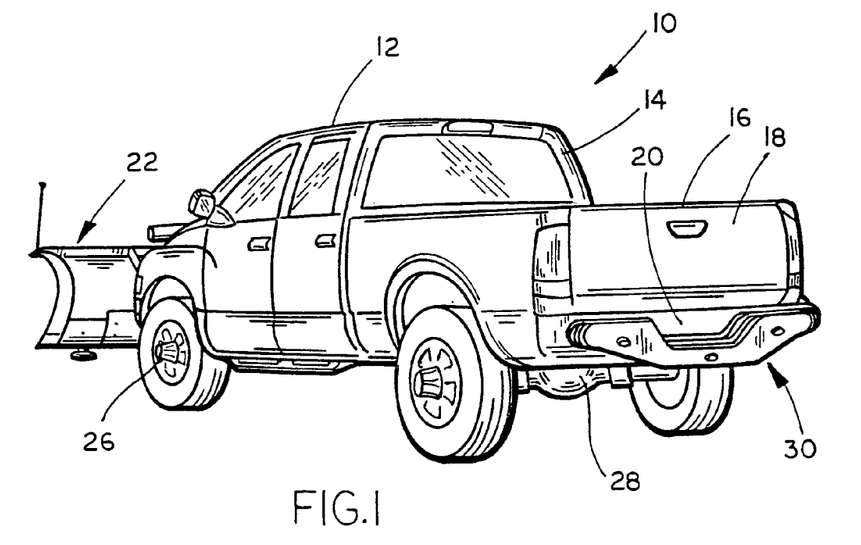
FIG. 1 is a rear perspective view of a pickup truck including a front mounted snowplow assembly and the ballast assembly of the present invention mounted at the rear of the truck.
Figure 2:
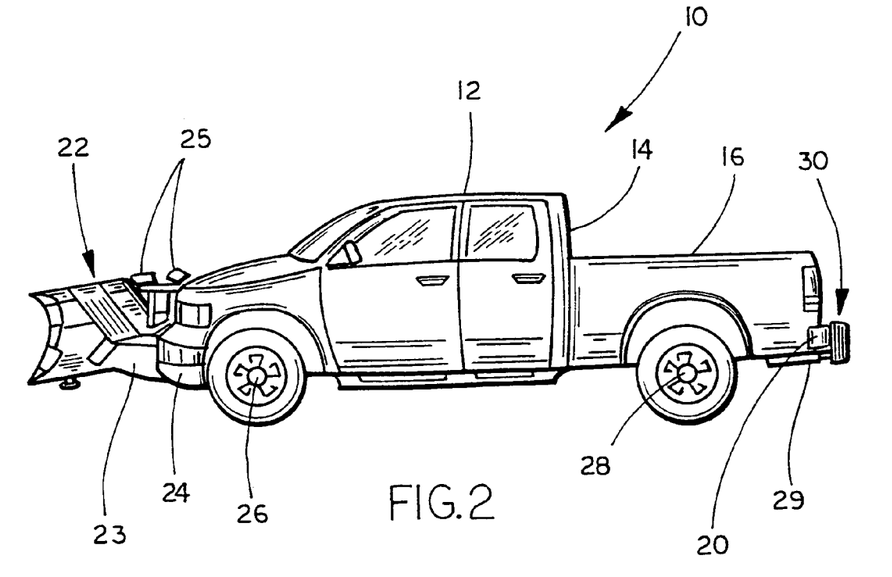
FIG. 2 is a side elevation of the pickup truck of FIG. 1 including a snowplow assembly at the front truck end and the ballast assembly of the present invention mounted at the rear of the truck.
Figure 3:
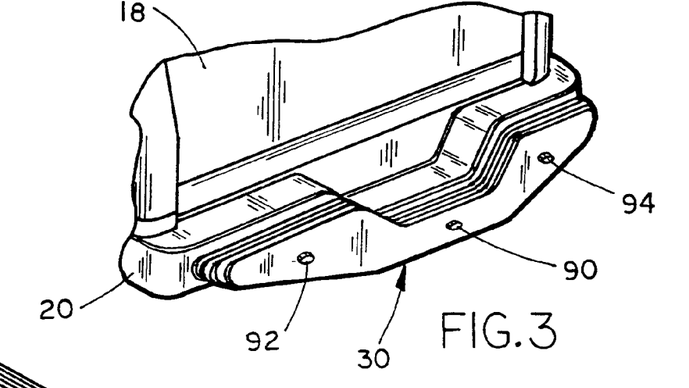
FIG. 3 is a fragmentary, perspective view of the ballast assembly of the present invention mounted adjacent the rear vehicle bumper on the truck shown in FIGS. 1 and 2.
Figure 4:
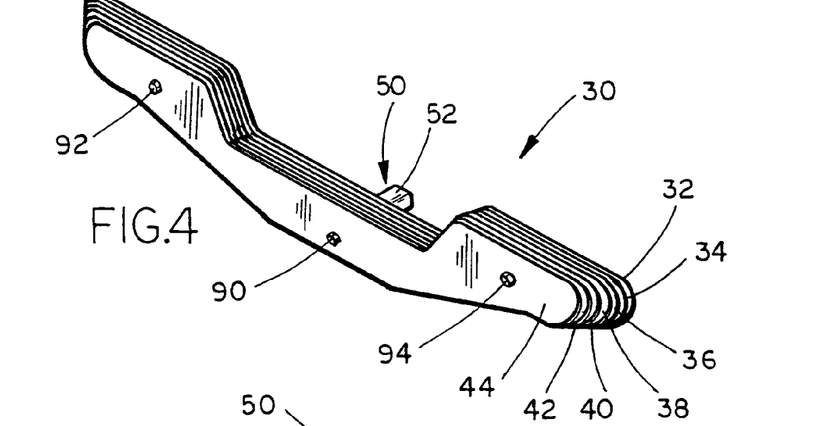
FIG. 4 is a perspective view of a preferred embodiment of the ballast assembly when removed from the vehicle.
Figure 5:
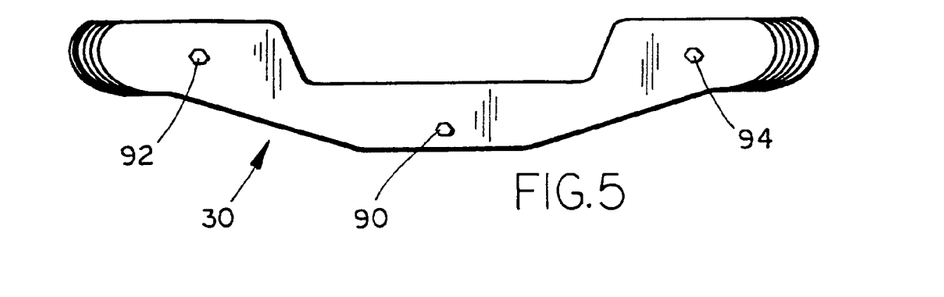
FIG. 5 is an elevation view of the ballast assembly shown in FIG. 4.
Figure 6:
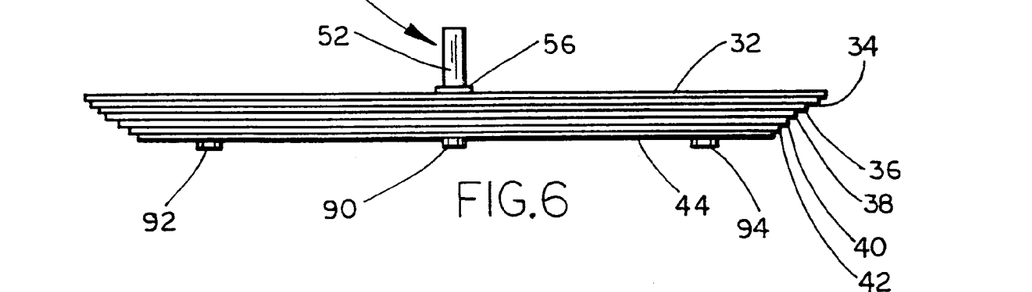
FIG. 6 is a top plan view of the ballast assembly shown in FIGS. 4 and 5.

Referring now to the drawings in greater detail, FIGS. 1 and 2 illustrate a conventional pickup truck 10 which exemplifies the type of vehicle which is commonly used in North America and other regions for snowplowing during the winter season. Truck 10 includes a cab 12, the rear 14 of which abuts an open cargo receiving area or cargo bed 16 which is adapted to receive and hold various types of cargo for hauling purposes. At the rear of the truck adjacent a cargo door or tailgate 18 adapted to provide entry into cargo bed 16 is the rear bumper 20. At the front of the vehicle, a snowplow assembly 22 is mounted, typically by means of a horizontally extending hitch assembly 23, to the frame of the truck 10 beneath the front bumper 24. In order to allow pivotal movement of the plow during plowing operations, plow assembly 22 extends a significant distance outwardly from the truck frame forwardly of the vehicle on hitch assembly 23. Such extension, along with associated apparatus for raising and lowering the plow, elevated headlights 25, and the like, creates a significant imbalance and weight transfer on the vehicle from the normally more balanced condition in which weight is relatively equally balanced over the front and rear axles 26, 28 to one in which a significantly greater amount of weight is supported by the front axle 26. This can be seen from the forwardly tilted angle of the truck body in FIG. 2 when supported on axles 26, 28 with the plow assembly 22 mounted thereon.

The present invention is adapted to help counterbalance the weight of plow assembly 22 on the vehicle by providing a ballast assembly 30 secured in the optimum counterbalancing position as far rearwardly on the vehicle as possible adjacent rear bumper 20. As explained more fully below, in a preferred embodiment of the invention, ballast assembly 30 utilizes the existing receiver hitch socket 29 which is commonly available on pickup trucks and utility vehicles below rear bumper 20 for mounting and support thereby leaving the cargo bed 16 open and unobstructed and available for use for normal cargo hauling duties even when the plow assembly 22 and ballast assembly 30 are mounted on the truck.

As is best seen from FIGS. 4–7, the preferred embodiment 30 of the ballast assembly includes a series of generally planar metal plates each of which is cut, shaped, and contoured to conform to the shape of the adjacent rear bumper 20 of the vehicle. In the preferred form, ballast assembly 30 includes a series of shaped and contoured steel plates 32–44 stacked one against the other and secured in a compact assembly. A first or initial ballast plate or member 32 has a shape and contour approximating the shape of the rear surface of bumper 20 while its top edge 33 includes a central recess 33a corresponding to the recess 20a in rear bumper 20. In addition to rounded, outwardly extending ends 32a, 32b, first ballast plate 32 also includes a downwardly extending, central area 32c having a lower portion adapted to project downwardly below the lower surface of rear bumper 20 as shown in FIG. 2. Area 32c includes a square or other aperture 46 adapted to correspond to and slidably receive the end of a vehicle mounting member or support projection 50. Support projection 50 is an elongated tube or bar preferably square in section adapted for receipt in the correspondingly shaped hitch receiver socket 29 on truck 10 as explained above. Bar 50 includes a first, forwardly extending, elongated section 52 adapted to be received in socket 29, and a rearwardly extending, second section 54 adapted to project rearwardly of the vehicle when section 52 is mounted in socket 29 such that apertures in plates 32–44 may be received over section 54. A flange 56 extends around bar 50 intermediate sections 52 and 54 to limit the telescoping insertion of section 52 into receiver socket 29 and of plates 32–44 over section 54. When inserted in socket 29, a securing pin 60 may be projected through an aperture in socket 29 and securing aperture 58 in bar section 52 to hold the mounting bar in place. A retainer clip 62 may be inserted through an aperture extending transversely through the shaft 61 adjacent the end of securing pin 60 when so mounted. The rearwardly extending free end of support projection 54 includes an axially extending threaded aperture 64 for receipt of a securing fastener as will be more fully explained below. In addition, on the rearwardly facing surface of first ballast plate 32 at positions spaced from aperture 46 are secured rearwardly extending support projections or cylinders 48a, 48b each of which includes a threaded aperture in the rearwardly facing surface thereof.

Figure 7:
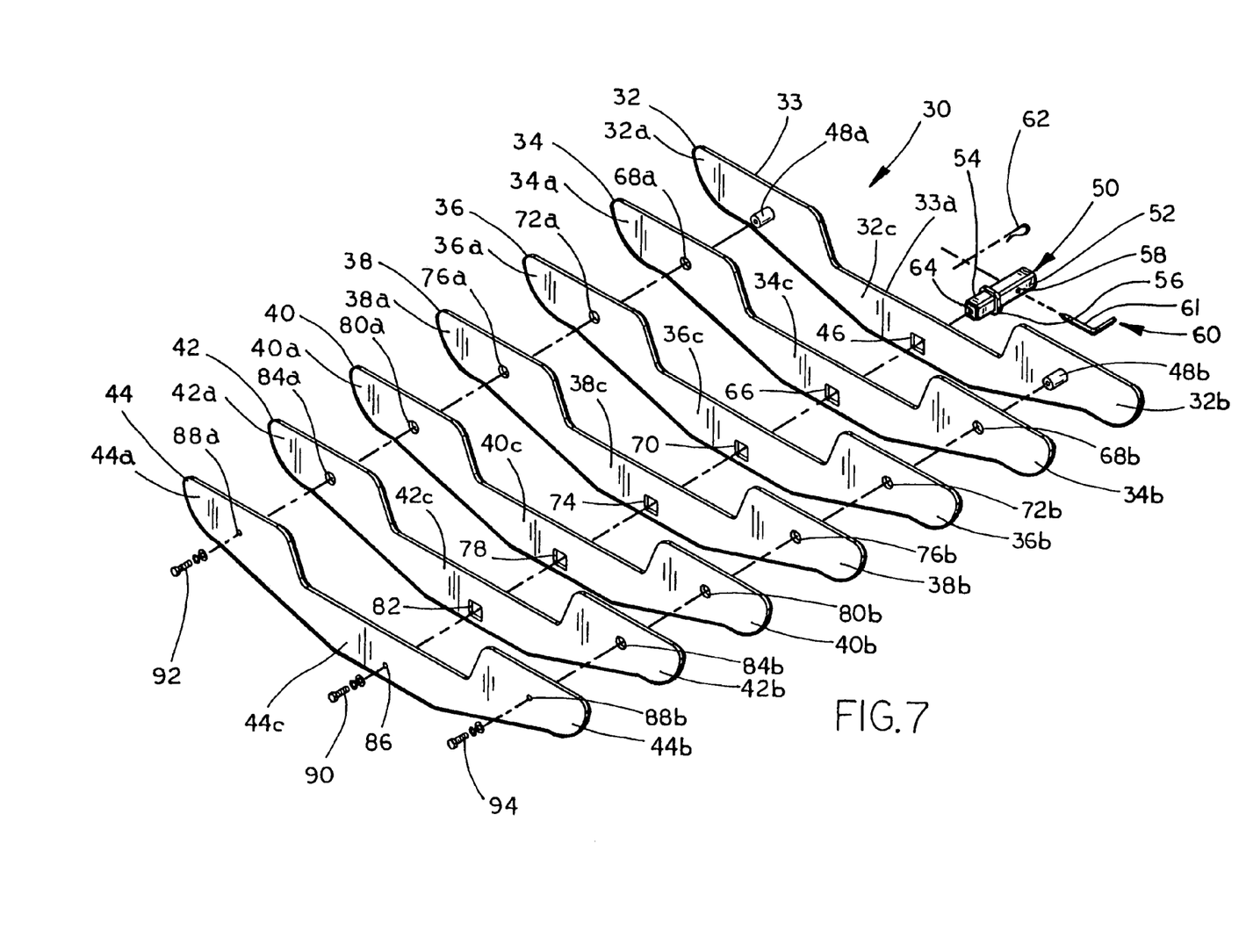
FIG. 7 is an exploded, perspective view of the ballast assembly shown in FIGS. 4–6.

A series of additional, generally planar ballast plates 34–44 is also provided to make up assembly 30 and add ballast weight to first ballast plate 32. Each additional ballast plate is substantially similar in shape and contour to first plate 32 but is slightly smaller in overall dimension. Ballast plate 34 includes outwardly extending rounded end portions 34a, 34b, downwardly projecting central section 34c, aperture 66 adapted to be received over support projection 54, and spaced circular apertures 68a, 68b adapted to be received over support cylinders 48a, 48b when ballast plate 34 is mounted on support projection 54 and stacked against the rearwardly facing surface of first ballast plate 32.

Similarly, third ballast plate 36 includes rounded, outwardly extending end portions 36a, 36b, downwardly extending central section 36c, and mounting apertures 70, 72a, and 72b.

In similar fashion, fourth ballast plate 38 includes outwardly extending rounded end portions 38a, 38b, downwardly extending central section 38c, and mounting apertures 74, 76a, and 76b. Fifth ballast plate 40 includes outwardly extending, rounded end portions 40a, 40b, downwardly extending central section 40c, and mounting apertures 78, 80a, and 80b. Sixth ballast plate 42 includes outwardly extending, rounded end portions 42a, 42b, downwardly extending central section 42c, and mounting apertures 82, 84a, and 84b.

In addition, a seventh ballast plate 44, which is also similar in shape and contour to the remaining six ballast plates but slightly smaller than sixth ballast plate 42, includes outwardly extending end portions 44a, 44b and downwardly extending central section 44c. However, instead of including mounting apertures as in the other ballast plates, ballast plate 44 includes smaller apertures 86 and 88a, 88b. Fastener receiving aperture 86 is aligned with the centers of apertures 46, 66, 70, 74, 78, and 82 for receipt of a threaded bolt or other securing fastener 90 when the ballast plates are stacked against one another and fitted over support projection 54 such that the head on fastener 90 will retain plate 44 in place while the threaded body of fastener 90 is received in aperture 64 of mounting member 50. Similarly, aperture 88a is adapted to receive the shaft of a threaded fastener or bolt 92 therethrough, aperture 88a being aligned with the centers of apertures 68a, 72a, 76a, 80a, and 84a, and the threaded aperture in mounting support 48a for receipt therein. The head on fastener 92 retains plate 44 against the other plates and on support projection 48a. Similarly, securing aperture 88b is centered and aligned with apertures 68b, 72b, 76b, 80b, and 84b, as well as the threaded aperture in support projection 48b for receipt therein. The head on fastener 94, when received through these aligned apertures and secured in support projection 48b, facilitates the retention of plate 44 against the remaining plates and on support projection 48b.

Preferably, support projection 54 is received through aperture 46 on first ballast plate 32 with flange 56 welded to the forward facing surface of the steel plate to retain the mounting projection 50 in place on plate 32. Likewise, support projections 48a and 48b are welded to the rearwardly facing surfaces of plate 32 for receipt of the remaining plates as mentioned above. In this manner, ballast plate 32 is ready for mounting on the vehicle as explained below.

With reference to FIGS. 3–6, the installation and use of the ballast assembly 30 will now be understood. Preferably, the first ballast plate 32 with mounting projection 50 and support projections 48a, 48b secured thereto as explained above is lifted to the level of the rear bumper 20 on truck 10 such that section 52 of mounting projection 50 is aligned with the hitch receiver socket 29 on the truck, and the plate is moved forwardly toward the vehicle such that section 52 is telescoped into the socket of the hitch receiver. Securing pin 60 is passed through the aligned aperture in socket 29 and aperture 58 with securing clip 62 secured to the shaft 61 of pin 60 to retain the mounting projection in the hitch receiver socket. Thereafter, plates 34–44 are successively mounted to the first plate by lifting each plate individually in succession into alignment with the first plate such that the central apertures 66, 70, 74, 78, and 82 may be telescoped over support projection 54 while support projection 48a extends through apertures 68a, 72a, 76a, 80a, and 84a, and support projection 48b extends through apertures 68b, 72b, 76b, 80b, and 84b. Thereafter, seventh ballast plate 44 is lifted and aligned with sixth ballast plate 42 while fasteners 90, 92, and 94 are passed through apertures 86, 88a, and 88b, respectively, through the aligned mounting apertures in the remaining plates, and secured in the threaded apertures 64 of mounting projection 54 and the threaded apertures of support projections 48a, 48b. Fasteners 90, 92, and 94 thereby retain plate 44 against the rearward most surface of sixth ballast plate 42 such that all the plates are stacked and held tightly together as shown in FIGS. 3–6. Thus, the entire assembly is supported and suspended on the vehicle by means of receiver hitch socket 29 and mounting projection 50 while the individual ballast plates 34–44 are retained and supported on first ballast plate 32 by means of support projections 54, 48a, and 48b while fasteners 90, 92, and 94 retain all of the plates 34–44 on and against first ballast plate 32.

Alternately, the second through seventh ballast plates 34–44 may be assembled on first ballast plate 32 in the manner described above prior to mounting the entire assembly on the vehicle adjacent rear bumper 20. In this method, a forklift, pair of jacks, hoist, or other mechanism may be used to facilitate the lifting of the entire assembly and its alignment for mounting on the vehicle. Similarly, disassembly of the ballast assembly 30 from the vehicle may be made either by removing the entire assembly in one operation using a forklift, jacks, or other lifting apparatus, or in piecemeal fashion by individually disassembling the ballast plates 44–34 in reverse order from first ballast plate 32 after removing fasteners 90, 92, and 94. Thereafter, the first ballast plate may be removed from receiver hitch socket 29 by removing clip 62 and securing pin 60 and sliding mounting projection 50 out of the receiver socket.

Preferably, the number of ballast plates used in assembly 30 will depend on the total weight desired for ballast purposes. Typically, when seven plates of the type shown in FIGS. 3–7 are used, the weight of the entire assembly 30 will approximate 500 pounds. Preferably, each plate will not exceed 100 pounds in weight such that it can be lifted and hung either on the receiver socket 29 or on the next adjacent ballast plate by one person. Should less than the full number of seven or other plates be desired for use as ballast, a series of washers may be fitted around each of the fasteners 90, 92, and 94 and support projections 48a, 48b to take up the space between the heads of the fasteners and the last ballast plate 50 thereon and prevent the ballast plates from sliding forwardly and rearwardly during use of the vehicle.

The positioning of the ballast assembly 30 rearwardly of the rear axle and against the outermost surface of the rear bumper of the vehicle allows a lesser amount of ballast to be used to counterbalance the plow assembly weight on the front of the vehicle than with previously known ballast weights fitted in the cargo area of the truck 10. In addition, the attachment of the ballast assembly adjacent the rear bumper and in the hitch receiver socket 29 prevents the ballast from moving during rapid acceleration or deceleration of the truck during use or plowing, while installation is rapid and efficient as described above thereby leaving the cargo area of the truck open and unencumbered for cargo hauling purposes. In addition, the contoured shape of the ballast assembly is aesthetically pleasing and coordinated with the shape of the vehicle rear bumper to be unobtrusive in use.

Figure 8:
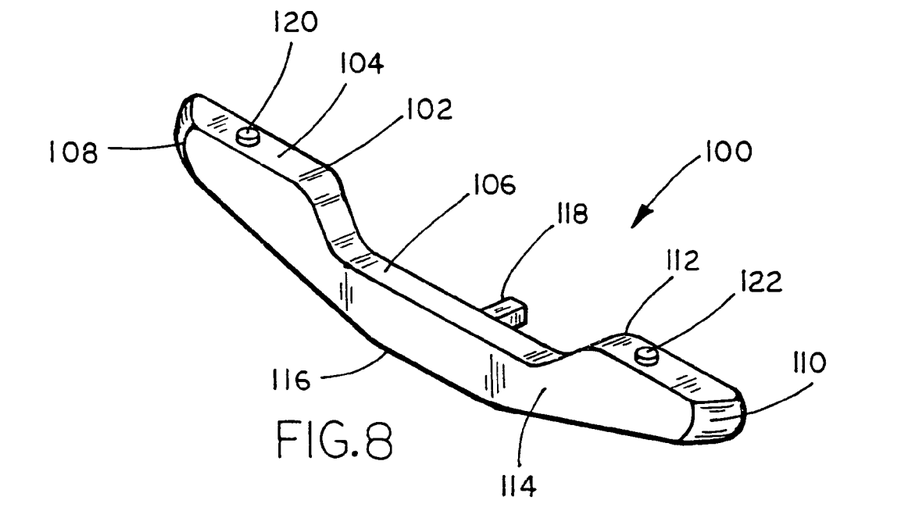
FIG. 8 is a perspective view of a second embodiment of the ballast assembly of the present invention.
Figure 9:
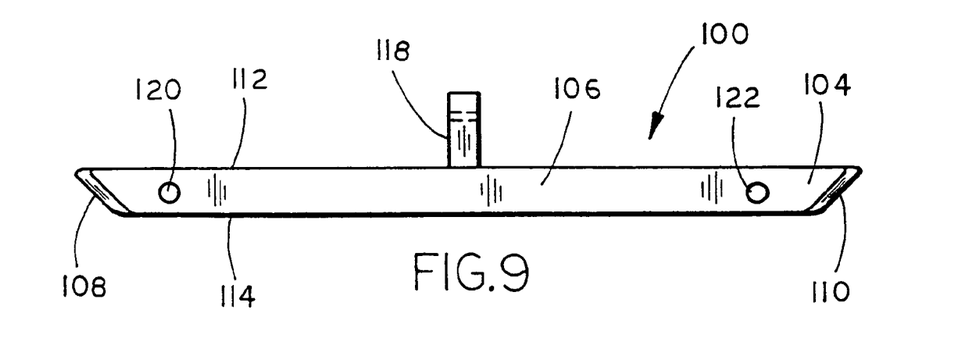
FIG. 9 is a top plan view of the ballast assembly of FIG. 8.
Figure 10:
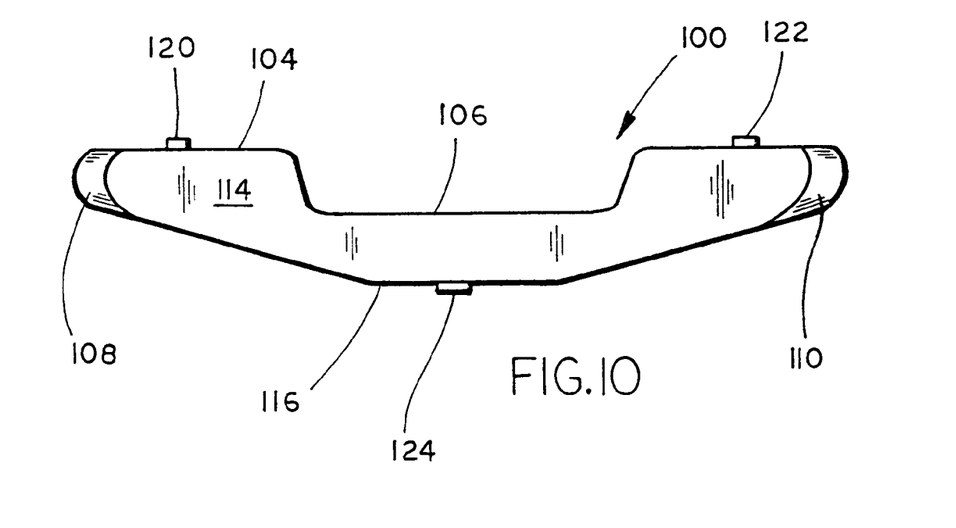
FIG. 10 is an elevation view of the ballast assembly of FIGS. 8 and 9.

An alternate embodiment 100 of the ballast assembly is shown in FIGS. 8–10 and includes a hollow enclosure 102 which is coordinated with the shape and contour of the rear bumper of the vehicle 10 in a manner similar to the assembled ballast assembly 30 described above. Enclosure 102 includes a top surface 104 having a recessed center area 106, inwardly angled end surfaces 108, 110, front and rear surfaces 112, 114, and bottom surface 116. Preferably, enclosure 102 is formed with a molding process such as rotational molding from a polymeric material such as linear, low density polyethylene, or high density, cross-linkable polyethylene. Ballast assembly 100 also includes a mounting projection 118 extending forwardly from forward surface 112 of assembly 100 for receipt in hitch receiver socket 29 and attachment using a securing pin in the manner described above for ballast assembly 30. In addition, threaded cap or other closures 120, 122 may be mounted on the top surface 104 of enclosure 102 for removal and filling of the hollow enclosure with a weighted material such as sand, gravel, or other small, dense material either before or after installation on the vehicle. One or more removable closures such as closure cap 124 may be included on bottom surface 116 for removal and opening at the end of the season to release the weighted material from the hollow enclosure thereby facilitating removal of the assembly from the vehicle by reducing its weight before disassembly.

Alternately, enclosure 102 may be filled with a permanent weighted material such as uncured concrete which later hardens and sets up to remain permanently within enclosure 102. In such case, assembly 100 may be installed and removed from the vehicle using a forklift truck or appropriate jacks or hoist for resting on a stand or support when not in use on the vehicle.

In a further embodiment of the invention, instead of a support projection 50 inserted into hitch receiver socket 29 to mount ballast assembly 30, other mounts could also be used. For example, one or more mounting arms or projections secured to first ballast plate 32 and extending forwardly could be removably engaged with and bolted or otherwise fastened to the vehicle frame adjacent the rear bumper or other vehicle area where the assembly is to be mounted. In such case, the ballast members 32–44 would be shaped and contoured to extend around and over the area below the vehicle bumper such that the hitch receiver socket would remain accessible for receipt of an elongated ball hitch projection. With such configuration, the vehicle could be used to tow a trailer while the ballast assembly remained mounted on the vehicle.

Likewise, hollow enclosure 102 could be bolted or otherwise fastened to the vehicle frame using one or more projecting arms. Hollow enclosure 102 could also be molded and contoured to extend around or over the hitch receiver socket to provide an opening or access to the hitch receiver socket to allow mounting of an elongated ball hitch projection while the filled hollow enclosure remained mounted on the vehicle for ballast. The vehicle could then be used to tow a trailer without removing the ballast assembly.

While assemblies 30 and 100 have been shown mounted on the rear of a truck 10 or other vehicle, it will be apparent that the assemblies could also be mounted at the front of a vehicle adjacent the front bumper on the vehicle frame or the like to counterbalance a rear plow assembly, such as a pull plow, when mounted to the rear end of a truck or other vehicle. Accordingly, the ballast assembly of the present invention is useful in various positions on a vehicle. In each case, the assembly is preferably shaped and contoured to the area of the vehicle adjacent which it is fitted to be as aesthetically pleasing and unobtrusive as possible when on the vehicle.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow and under the doctrine of equivalents.

The embodiments of the invention in which an exclusive property or privilege is claimed are defined as follows:

1. A ballast assembly for use on a vehicle as a counterweight to an implement on the vehicle, the vehicle having a size and a shape in an area to which said ballast assembly is to be mounted, said assembly comprising:
   a ballast member having a predetermined weight and a size and a shape which conforms to the size and the shape of the vehicle in the area to which said ballast assembly is to be mounted; and
   a vehicle mounting member on said ballast member adapted to mount on the vehicle in the area to which said ballast assembly is to be mounted;
   said mounting member projecting outwardly from said ballast member and adapted for removable engagement with the vehicle;
   whereby when installed on the vehicle, said assembly provides a counter balance for an implement mounted on the vehicle;
   support means on said ballast member for adding additional ballast weight to said assembly;
   said ballast member is a first plate, said assembly including a plurality of additional plates, said support means including at least one support projection for receiving and supporting said plurality of additional plates on said first plate;
   said plurality of additional plates mounted on said support projection;
   said first plate and said additional plates are each sized and shaped so as to to conform to a size and a shape of a bumper on an end of the vehicle;
   said first plate has a predetermined size and shape, said additional plates each having a shape similar to the shape of said first plate but being successively smaller in perimeter size as compared to said first plate when said plates are viewed head on.

2. The ballast assembly of claim 1 wherein said first plate and said plurality of additional plates plate are each generally planar and are adapted to be stacked one against the other.

3. The ballast assembly of claim 1 wherein said vehicle mounting member is an elongated mounting projection adapted to be received in a hitch receiver socket at one end of the vehicle adjacent the vehicle bumper.

4. The ballast assembly of claim 3 wherein said mounting projection includes said support projection, said plurality of additional plates each including a first aperture receiving said support projection such that said first plate and said plurality of additional plates are stacked against one another.

5. The ballast assembly of claim 4 including at least a second support projection spaced from said one support projection, said one support projection and said second support projection extending outwardly away from said first plate, said plurality of additional plates each including a second aperture spaced from said first aperture for receiving said second support projection.

6. The ballast assembly of claim 5 including a third support projection, said first support projections positioned generally centrally on said first plate, said second and third support projection spaced from one another and on either side of said first support projection; said plurality of additional plates each including a third aperture spaced from said first and second apertures, said third aperture receiving said third support projection.

7. The ballast of claim 6 including a fastener mounted in at least one of said first, second, and third support projections to retain said plurality of additional plates said assembly.

8. The ballast assembly of claim 6 wherein each of said first, second, and third support projections includes a fastener mounted thereon, said fasteners retaining said plurality of additional plates on said assembly.

* * * * *

UNITED STATES PATENT AND TRADEMARK OFFICE
CERTIFICATE OF CORRECTION

| | | |
|---|---|---|
| PATENT NO. | : 7,152,883 B2 | Page 1 of 1 |
| APPLICATION NO. | : 10/749047 | |
| DATED | : December 26, 2006 | |
| INVENTOR(S) | : Cal G. Niemela | |

It is certified that error appears in the above-identified patent and that said Letters Patent is hereby corrected as shown below:

Column 10, line 2-3, Claim 2, reads: "and said plurality of additional plates plate are each generally"; it should read: -- and said plurality of additional plates are each generally --.

Column 10, line 29, Claim 7, reads: "7. The ballast of claim 6 including a fastener mounted in"; it should read: -- 7. The ballast assembly of claim 6 including a fastener mounted in --.

Column 10, line 31-32, Claim 7, reads: "tions to retain said plurality of additional plates said assembly."; it should read: -- tions to retain said plurality of additional plates on said assembly. --.

Signed and Sealed this

Fourth Day of May, 2010

David J. Kappos
*Director of the United States Patent and Trademark Office*